J. B. WIARD.
INDUCTION MOTOR.
APPLICATION FILED JAN. 20, 1915.

1,190,054.

Patented July 4, 1916.

Witnesses:
Lester H. Bulmer,
J. Ellis Glen.

Inventor:
John B. Wiard,
by Albert G. Davis
His Attorney.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

INDUCTION-MOTOR.

1,190,054.  Specification of Letters Patent.  Patented July 4, 1916.

Application filed January 20, 1915. Serial No. 3,224.

*To all whom it may concern:*

Be it known that I, JOHN B. WIARD, a citizen of the United States, residing at Lynn, in the county of Essex, State of Massachusetts, have invented certain new and useful Improvements in Induction-Motors, of which the following is a specification.

My invention relates to induction motors, and particularly to the secondary members of such motors.

It has for its object a novel construction which is cheap to manufacture, light in weight, and in which there are no joints in the electrical circuit.

To this end, my invention consists in providing annular laminations mounted on a hub provided with thrust collars and having conducting members extending through conductor receiving openings in the laminations, the conducting members and hub being connected at the ends of the laminations by end rings, and the conducting members, end rings, thrust collars and hub molecularly united as by being all formed of a single casting. I preferably use aluminum for this casting as it may be molded at a low temperature and is light in weight, and is therefore particularly advantageous in a secondary member which must be frequently reversed in direction.

For a better understanding of my invention reference may be had to the following description taken in connection with the accompanying drawing in which—

Figure 2:
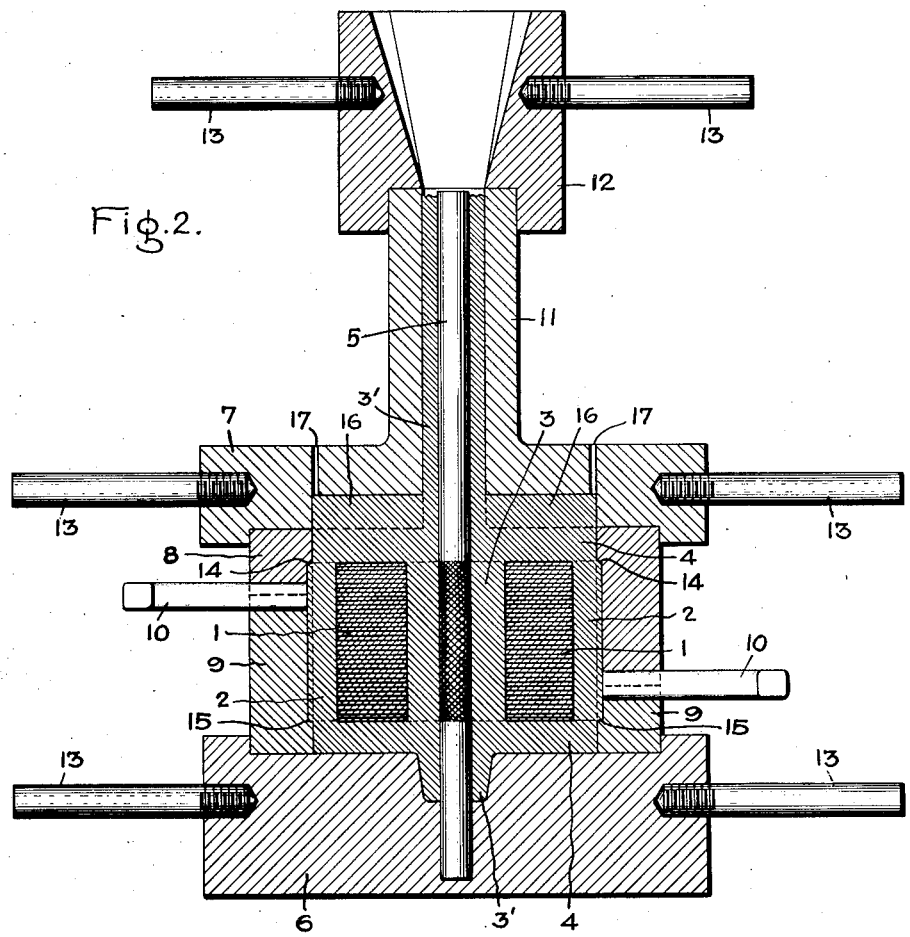
Figure 1:
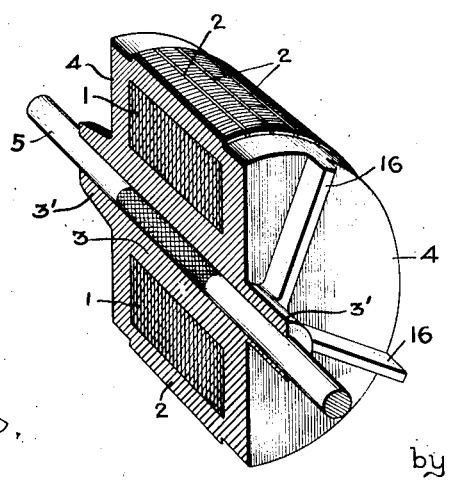

Figure 1 is a perspective view, partly in section, of a secondary member of an induction motor embodying my invention, and Fig. 2 is a sectional view of a mold with the secondary member of Fig. 1 therein.

Referring to the drawing, 1 are laminations in the form of annuli provided with conductor receiving openings near their outer periphery through which conducting members 2 extend. The conductor receiving openings may be either open or closed slots, but I have preferred to show them as open, that is, with a small opening extending from the slot to the periphery of the laminations. The laminations are mounted on a hub 3, and end rings 4 at the ends of the laminations connect the conducting members 2 and the hub 3. Thrust collars 3' are provided for taking up any thrust of the shaft against the bearings (not shown). The hub, thrust collars, end rings and conducting members are molecularly united as by being formed of a single casting which is preferably of aluminum. A rotor constructed in this way is light in weight, cheap to construct and has no joints in the electrical circuits. The parts may be cast about a knurled shaft 5, in which case the hub is securely fastened thereto, and will transmit the torque of the secondary member to the shaft 5.

The mold shown in Fig. 2 comprises a drag 6, a cope 7, and an intermediate ring, which is split perpendicularly to its axis to form two similar halves 8 and 9 with tongue and groove joints between the halves, the halves being locked together by the keys 10. Extending upward from the cope 7 is the sprue 11 on top of which is the head 12. The drag, cope and head are provided with handles 13 for convenience in handling. When preparing the mold for a casting, the laminæ 1 forming the core are clamped between the shoulders 14 and 15 of the parts of the ring 8 and 9, respectively, and the armature shaft 5 is passed through the bore of the core and the end inserted in a socket in the drag 6. The mold is shown as being provided for casting four fan blades 16, at one end of the armature. Small holes 17 are drilled through the top of the cope 7 into the fan blade grooves to allow the gases from the molten metal to escape. The mold may also be arranged for casting supports for a centrifugal switch, which is used in single phase induction motors for opening the circuit of a starting winding on the stator after the motor is up to speed. The casting then combines in one piece the hub, two end rings, the conducting members, two thrust collars, supports for a fan on the fan blades themselves and supports for the switch mechanism. The armature shaft is illustrated as being cast in place, but it may be fastened in place in the usual manner.

What I claim as new and desire to secure by Letters Patent of the United States, is:—

1. A secondary member for an induction motor comprising laminations in the form of annuli provided with conductor receiving openings near their outer periphery, a central hub in which said laminations are mounted, a shaft, thrust collars about said shaft, conducting members extending through said openings, and end rings at the ends of said laminations connecting said conducting members and said hub, said conducting members, hub, thrust collars and end rings being molecularly united.

2. A secondary member for an induction motor comprising laminations in the form of annuli provided with conductor receiving openings near their outer periphery, a central hub on which said laminations are mounted, a shaft, thrust collars about said shaft, fan blades, conducting members extending through said openings, and end rings at the ends of said laminations connecting said conducting members and said hub, said conducting members, hub, thrust collars, fan blades and end rings being molecularly united.

In witness whereof, I have hereunto set my hand this 14th day of January 1915.

JOHN B. WIARD.

Witnesses:
ROBERT SHAUD,
JOHN A. MCMANUS.